United States Patent [19]

Steele

[11] Patent Number: 4,749,145

[45] Date of Patent: Jun. 7, 1988

[54] IN-CASSETTE TAPE TENSIONING APPARATUS

[75] Inventor: Robert B. Steele, Palo Alto, Calif.

[73] Assignee: Ampex Corporation, Redwood City, Calif.

[21] Appl. No.: 851,054

[22] Filed: Apr. 11, 1986

[51] Int. Cl.⁴ .................. B65H 77/00; G11B 15/32
[52] U.S. Cl. ............................ 242/186; 242/75.51; 318/7
[58] Field of Search ............ 242/75.5, 186, 75.51, 242/75.52, 191, 201–203; 318/6, 7; 360/71, 73, 72.3, 74.1–74.3

[56] References Cited

U.S. PATENT DOCUMENTS

| 3,870,934 | 3/1975 | Blood | 242/75.51 X |
| 3,910,527 | 10/1975 | Buhler et al. | 242/186 |
| 3,921,043 | 11/1975 | Luzio | 318/7 |
| 4,408,144 | 10/1983 | Lukes | 318/7 |

Primary Examiner—David Werner
Attorney, Agent, or Firm—Edward B. Anderson; George B. Almeida; Richard P. Lange

[57] ABSTRACT

Apparatus for tensioning tape extending between two reels in a tape transport system having servos for controlling the velocity and position of the reels, includes position servo loop for maintaining the first reel in a fixed position. A velocity servo loop controls the other reel for taking up slack in the tape between the reels and applying a relative force on the tape once the slack has been taken up. The velocity servo is limited in the amount of current applied to the motor driving the take up reel by a signal provided by a tension servo connected to the position servo associated with the other reel. In particular, the tension servo responds to the amount of current applied by the position servo for applying a motor-current-limiting signal to the velocity servo system. When the position servo is applying minimal current to the fixed-position reel (when the tape is slack), a relatively large amount of current is allowed to go to the take up reel. As the tape becomes taut and the fixed-position reel is pulled out of position, the position servo applies increasing current to the motor in order to attempt to return the reel to the fixed position. The tension servo responds to the increasing current applied by the position servo, for reducing the amount of current applied to the take up reel motor.

10 Claims, 3 Drawing Sheets

IN-CASSETTE TAPE TENSIONING APPARATUS

BACKGROUND AND SUMMARY OF THE INVENTION

This invention relates to tape-tensioning apparatus, and more particularly, to such apparatus for tensioning tape extending between two reels by basing the operation of one of the two reels on the operation of the other reel.

The need to regulate the tension in a magnetic tape in a tape transport is well-known, particularly when the transport forms part of a machine for recording signals on magnetic tape or playing back signals from such tape. The stretchability of magnetic tape is notorious and is particularly susceptible to changes in temperature and humidity. The mechanical stretching, even temporarily, of the tape causes misalignment of the magnetic domains forming a recorded signal on the tape. Excessive tension can also affect the physical wavelengths of signals recorded on the tape and thereby cause undesirable variations in the frequencies played back from the tape. The result is a deterioration in the quality of a played back signal.

In such applications, it is well-known to provide means for sensing the tape tension in a tape path extending between a supply reel and a capstan. A signal representing the tape tension may be used to control, in known manner, a motor driving the supply reel so as to tend to maintain the tape tension substantially constant. For this purpose it is known to provide a pivoted arm which carries a guide roller around which the tape guide extends to form a loop so that variation in the tape tension causes pivoting of the arm.

However, when a cassette containing tape is loaded in a transport, and just before or just after a threading cycle, the tension arms are held retracted and ready for cassette movement. In the retracted positions, the tension arms are not in contact with the tape and therefore are not available for providing control information regarding the tape tension. It is important in such situations, however, to maintain the tape in the cassette under tension so that during loading, threading and unloading, the tape extending between the reels in the cassette is in proper alignment relative to the transport mechanisms. Excess tape may become entangled or misfed. Further, it is important to eliminate slack in the tape so that when the tape is manipulated, the reels and other apparatus will not be operated at a rate which is likely to damage the tape when the slack is eliminated. Without the positioning of the tension arms against the tape, there has heretofore been no known mechanism for tensioning the tape while in the cassette at the time it is loaded and unloaded under controlled conditions.

A tape tensioning apparatus made according to the present invention provides slack-tape take-up and tensioning without requiring separate tape-tension sensing devices. More particularly, the invention provides for tape tensioning by coordinating the control of the two reels on which the tape is wound. Further, by slight modification of existing tape-controlling apparatus, the present invention may be incorporated into conventional tape transports, thereby providing a tape tensioning apparatus which is economical and compatible with existing systems.

The basis of the present invention resides in a tape-tensioning apparatus in which one tape reel is operated in a selected operating state, such as by holding the reel in a selected rotational position, and then controlling the operation of the other reel to take up the slack, if any, existing between the reels. Once any slack tape is taken up, counter-rotational forces are applied to both reels for applying a selected tension on the tape. In the preferred embodiment of the invention, a take-up reel is controlled by a servo to maintain the reel in a selected rotational position. When the reel is displaced from the selected position, energy is increased to urge the reel back toward the selected position. A second servo, responsive to the energization level of the first reel, operates the second reel to take up the slack in the tape between the two reels. Once the slack is taken up, a force is applied by the second reel to the first reel through the tape, thereby displacing it from the selected position. The energy applied to the second reel is then reduced in order to limit the tension on the tape to avoid damage to it. These and other features and advantages of the invention will be apparent from a consideration of the following description of a preferred embodiment of the invention with reference to the accompanying drawings.

BRIEF DESCRIPTION OF THE DRAWINGS

Referring to the two sheets of drawings.

DETAILED DESCRIPTION OF THE PREFERRED EMBODIMENT

Figure 1:
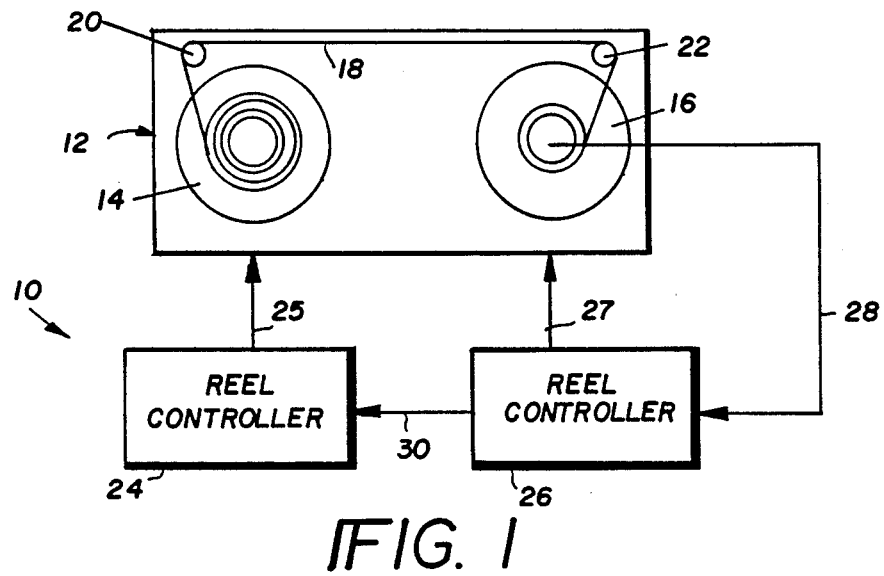
FIG. 1 is a simplified schematic illustration of a tape-tensioning apparatus according to the present invention in association with a tape cassette.

Referring initially to FIG. 1, a tape-tensioning apparatus 10 forming part of a tape transport machine, and made according to the present invention, is shown coupled to a cassette 12 as it would be positioned in the tape transport machine. Cassette 12 includes a left tape reel 14 and a right tape reel 16. A magnetizable recording tape 18 is wound at one end around reel 14. From reel 14 it extends around a tape guide 20, along one edge of cassette 12, to a second tape guide 22, and then around reel 16. As shown, tape 18 is disposed entirely within cassette 12, as it would be when first loaded in, or prior to removal from, the tape transport which also typically performs threading, recording, playback, and reverse threading operations. Threading and tension arm tape-manipulating guides are not in contact with tape 18 during the normal use of the preferred embodiment as it is described in the following description. It will be understood that the invention may also be practiced with any machine in which the tape is wound around and between two reels, regardless of the path of the tape between the reels, so long as there is relatively unrestrained tape travel between the reels. Further, it is not necessary that the reels be contained within a cassette, although this is an application in which the present invention provides particular advantages.

Reels 14, 16 are each controlled by reel controllers 24, 26, respectively. These reel controllers operate the reels, through mechanical couplings represented by lines 25, 27, in appropriate operating states to provide tape tensioning according to the present invention. In particular, reel controller 26 derives information indicative of the operating state of reel 16 as represented by line 28. Reel controller 26 is responsive to the information received on line 28 for controlling the operation of reel 16 so that it is operated in, or at least urged toward operation in, a selected operating state. That state most typically would be a fixed position, which may be considered as a velocity of zero. In this state, line 28 represents the position of reel 16.

So long as the reel is in a selected position, controller 26 does not need to apply energy to reel 16 to keep it in that position. When reel 16 is displaced from the selected position by an external cause, such as by a rotational force on the reel by the application of tension on tape 18, controller 26 responds by applying energy to reel 16 to urge it back to the selected position. As stated previously, tape 18 is very susceptible to excessive strain. It is therefore important that only a limited amount of tension be applied to tape 18. However, as will be seen, control will be enhanced by applying a force or torque to reel 16 which is directly proportional to the amount of displacement. As a result, an external force may be applied to reel 16 by an amount which displaces the reel an amount appropriate for producing a desired level of torque or force on the reel. When, as is the case described here, the external force is applied by tension on the tape, the appropriate tension is selected.

Reel controller 24 is responsive to a signal on a lead 30 extending between the two controllers, which signal is indicative of the amount of energy being applied to reel 16. Reel controller 24, in response to the signal on lead 30 controls the operation of reel 14. Reel 14 is operated in a manner which will result in the take-up of slack tape extending between the two reels. During this take-up process no force is applied from tape 18 to reel 16. Reel 14 therefore can be operated at a rotational velocity which will provide the most expedient take-up of the slack tape. This is typically achieved by applying a level of energy to reel 14 which, if applied to the tape with reel 16 held in a fixed position, could result in damage to the tape when the slack tape is completely taken up.

Alternatively, reel 14 could be operated with a low enough force that when the tape becomes taut the resulting force on reel 16 through the tape is insufficient to damage the tape. Such a force might not even be enough to overcome the static friction in the reel mechanism. However, assuming it is enough, normal tape drive motors would operate at such a slow speed that, depending on the amount of slack existing in the tape, a substantial amount of time would be required. Reel controller 24 therefore responds to the force applied to reel 16 to vary the force applied to reel 14. When slack tape exists, an essentially unrestrained force can be applied to reel 14. As the tape becomes taut, reel 16 is displaced from its selected position, reel controller 26 applies force to reel 16 for urging it back to the selected position. Reel controller 24, sensing this increase in force on lead 30, then limits the force applied to reel 14 to a level which is non-destructive of the tape. A steady-state condition is achieved in which a slight amount of force is applied to reel 14, thereby maintaining reel 16 in a slightly displaced position. A countering force is applied to reel 16, and tape 18 is maintained at a reasonable tension.

It is conceptually possible that this invention could be practiced with both reels rotating. However, the dynamics of such a system would make its operation erratic. When one reel is maintained in a selected position, as described herein, a relatively constant tension is achieved, the amount of tape on the respective reels is not a factor; and the tape is maintained in the same position on the reels.

Figure 2:
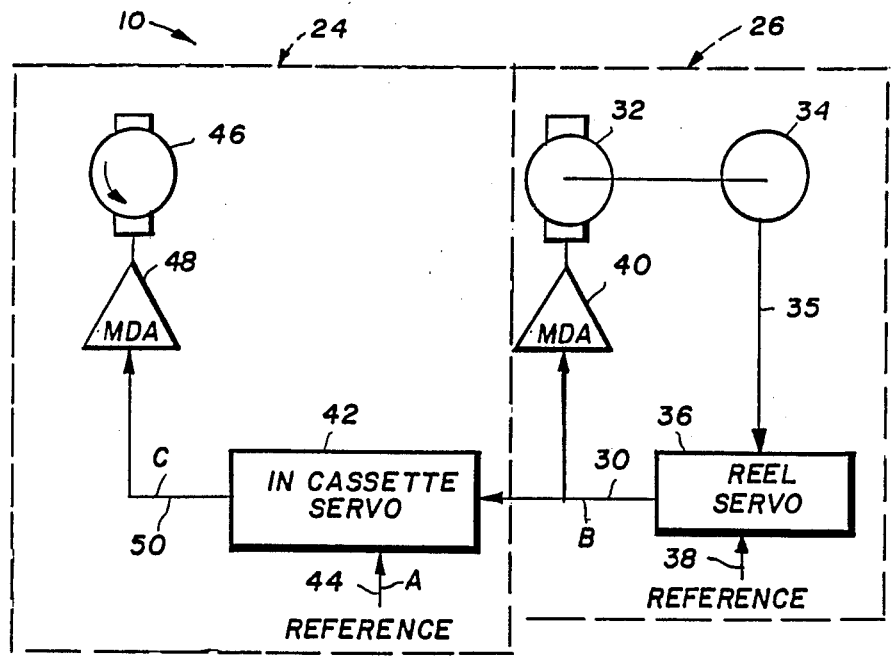
FIG. 2 is a more detailed diagram of the apparatus of FIG. 1.

Referring now to FIG. 2, the tape tensioning apparatus 10 is shown in block diagram form as a servo system. Servo systems are well-known in the industry for use in tape transport operations. A representative description of such a system is described in U.S. Pat. No. 4,513,229, issued Apr. 23, 1985 for "REEL SERVO FOR TAPE TRANSPORT". Motor 32 drives reel 16 (shown in FIG. 1) as represented by line 27. The shaft of the motor, which rotates with reel 16, is directly connected to an optical tachometer 34 or other suitable device for sensing the position or rotation of reel 16. This sensing provides the information represented by line 28 in FIG. 1. Tachometer 34 generates a corresponding signal on lead 35 which is input to a reel servo 36. Servo 36 also receives as an input on a lead 38, a reference signal which designates the selected operating state of reel 16. As is well-known, this reference can be varied to designate operation at a selected velocity or at zero velocity (a fixed position). In this preferred embodiment, as has been discussed, a reference is selected to provide for holding reel 16 in a selected rotational position. So long as reel 16 stays in a selected rotational position, a comparison of the signals on leads 35 and 38 results in a zero-error signal being produced on lead 30. This signal is coupled to a motor drive amplifier (MDA) 40 which drives motor 32. In this case, the signal on lead 30 is representative of the energization of motor 32. Since the reel is in the selected position, no energization is required.

Figure 5:
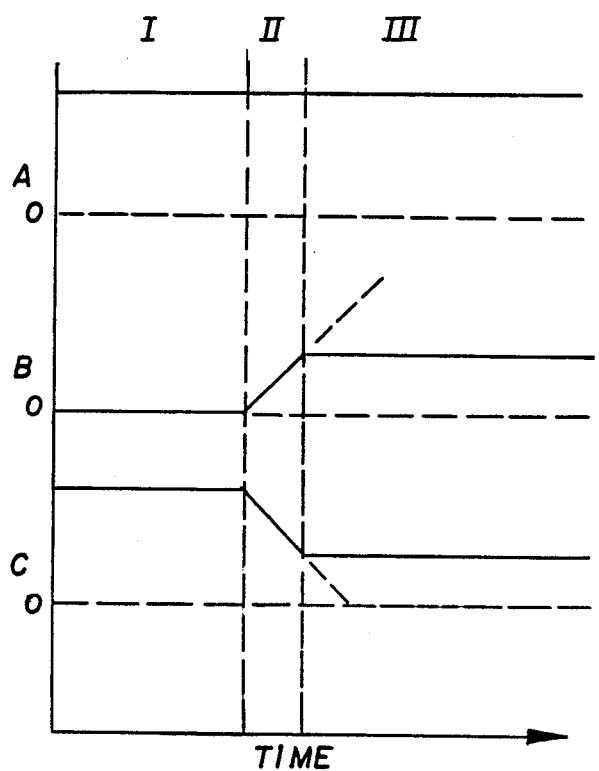
FIG. 5 is a time-based signal chart illustrating primary signal levels in the apparatus of FIGS. 2, 3.
Figure 6A:
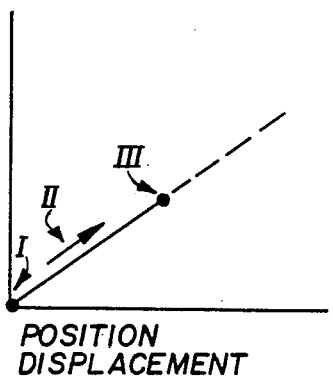
FIGS. 6A, 6B are diagrams illustrating the motor force applied to reels as a function of reel position displacement and motor input signal level, respectively, for the motors of the apparatus of FIGS. 2, 3, 5.

Referring briefly to FIG. 5, the central signal shown in the figure, identified as signal B, represents the time-based signal on lead 30. The initial time period, identified as period I, is the time when reel 16 is in the selected position and the effective signal level is 0. FIG. 6A is a simplied diagram showing the force applied by motor 32 to reel 16 for a given position displacement. During period I there is no position displacement, so no force is applied.

Referring again to FIG. 2, the signal on lead 30 is connected to an in-cassette servo 42. Servo 42 also receives on an input lead 44 a reference signal. The reference signal is set at a level which will drive a motor 46 (coupled to reel 14 as represented by line 25 in FIG. 1) through a corresponding motor drive amplifier (MDA) 48 at a level sufficiently high to cause any slack to be taken up. This reference signal is represented by signal A in FIG. 5 and is constant. During time period I, lead 30 has a zero level and lead 44 has the reference level. Servo 42 outputs a signal on a lead 50, which signal is represented by signal C in FIG. 5. With no signal on lead 30, signal C is proportional to signal A. Thus, servo 42 applies sufficient energization of motor 46 to take up tape rapidly on reel 14.

Figure 6B:
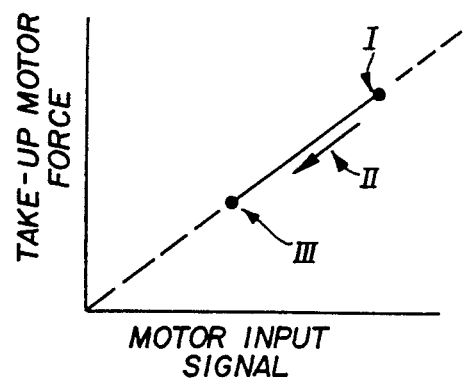

The transition phase in which the tape becomes taut is illustrated in FIG. 5 as period II. Describing this transition with reference to FIGS. 1, 2, as soon as reel 16 is displaced from the selected position by tension on tape 18 produced by the taking up of tape on reel 14, a force is applied to reel 16 by motor 32 through energization determined by servo 36. The signal on lead 30 increases directly proportion displacement. The resulting signal on lead 50 produced by servo 42 thus decreases correspondingly. FIG. 6B illustrates the force applied by take-up motor 46 for a corresponding level of input signal. The signal on lead 50 produces a corresponding energization of motor 46. In time period I, the signal level is determined by the reference on lead 44 so that a constant force is applied by motor 46. This is shown by the dot identified with "I" in FIG. 6B. During period II, reel 16 is displaced from the selected position and the energization of motor 32 increases, causing the energization of motor 46 to decrease, as shown by signal C in FIG. 5. FIG. 6B shows the resulting force reduction applied by motor 46 on reel 14 during this transition period. The maximum force on the tape is the lesser of the forces applied by reels 14, 16. Thus, the forces are controlled so that no damage to the tape results, yet slack tape is taken up very quickly.

As the energization of motor 46 decreases, the energization of motor 32 increases. A point is reached at which the force applied by motor 46 is equal to the force applied by motor 32. This is represented by the dot identified as "III" on FIGS. 6A, 6B and is the level of signals B and C in FIG. 5 which results in a continuous displacement of reel 16 from the selected position resulting from the application of a constant force applied through the tape by reel 14. The tape is then held in constant tension.

Figure 3:
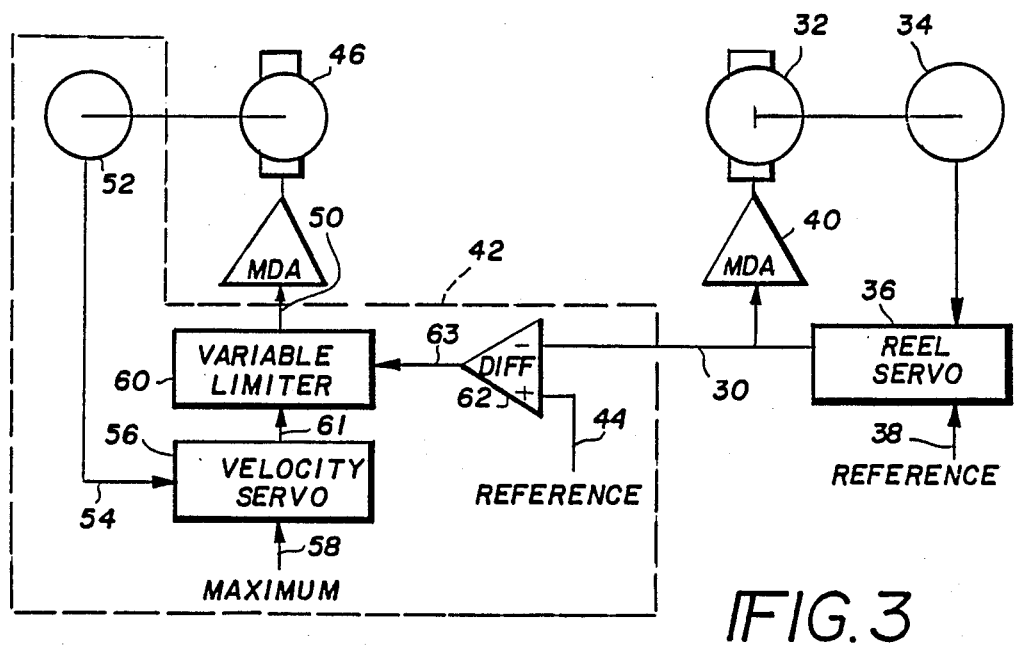
FIG. 3 is a schematic diagram similar to FIG. 2 showing implementation of the present invention in an existing tape transport system.

The embodiment of the present invention, described with reference to FIG. 2, may be incorporated into existing servos of a typical tape transport in order to also be able to operate reels 14, 16 during normal threading, recording and playback operations. FIG. 3 shows the tape tensioning apparatus of FIG. 2 incorporated into a conventional tape transport. The components are the same as shown in FIG. 2, except that servo 42 is made up of additional components. Servo 42 includes an optical tachometer 52, like tachometer 34, for sensing the rotation of motor 46, and therefore reel 14. Tachometer 52 produces a signal on a lead 54 which is input to a reel velocity servo 56. Servo 56 receives a reference signal on a lead 58 representing a maximum velocity for operation of motor 46.

Conventionally the output of servo 56 is connected directly to the input of MDA 48. However, in order to incorporate the control signal derived from the operation of reel 16, a variable limiter 60 which provides means for limiting the maximum energization of motor 46 is interposed servo 56 and MDA 48. Limiter 60 receives an energization signal on a lead 61 from servo 56 and provides means for limiting the maximum energization of motor 46, and therefore reel 14. The limiting is determined by the output of a comparator 62, shown as a differential amplifier, as received on a lead 63. The inverting input to amplifier 62 is connected to lead 30. The non-inverting input is connected to the reference on lead 44.

When there is a minimum signal on lead 30, the reference on lead 44 is fed through amplifier 62 to limiter 60. That reference is set high enough to provide quick take-up of the slack tape between the two reels. Thus, servo 56 is, during a tape tensioning operation as described herein, essentially constantly trying to run motor 46 at its maximum velocity since the actual velocity is limited, particularly when the tape is brought into tension. Thus, even though there may be substantial differences between the actual velocity of motor 46 and the maximum velocity, the amount of force which motor 46 is allowed to apply to reel 14 is limited to a range which will not damage the tape as the tape is brought into tension. Thus, the present invention works effectively as part of a conventional tape transport.

During normal playback and recording operations of motors 32, 46, the reference on lead 44 is set at a high enough value that the maximum velocity signal is not limited, so that the servo loop containing motor 46, tach 52, servo 56 and MDA 48 can operate to maintain motor 46 at a desired velocity, or allow switching of the servo system to provide for controlling motor 6 according to conventional tension arm-based tape tension control. Correspondingly, motor 32 can then be operated in its normal modes of operation without affecting the operation of motor 46.

Figure 4:
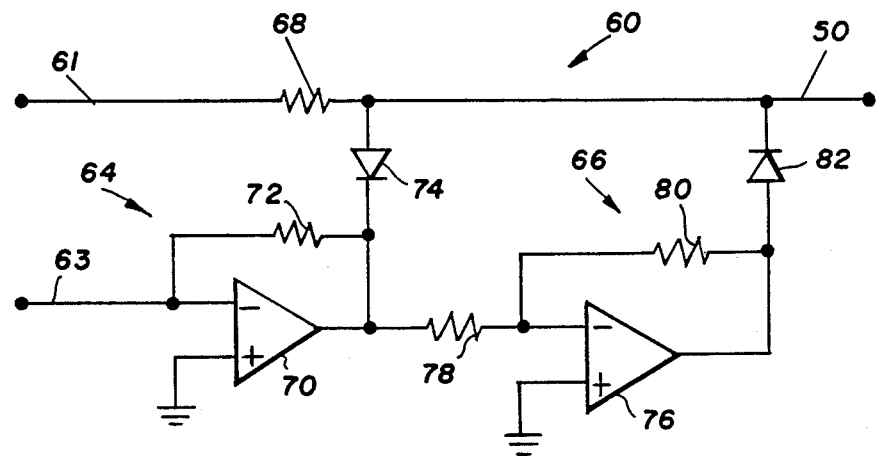
FIG. 4 is a circuit diagram of a variable limiter used in the apparatus of FIG. 3.

Referring now to FIG. 4, a representative circuit of variable limiter 60 is shown. Limiter 60 is actually a slicer circuit formed of positive and negative clipper subcircuits 64, 66, respectively. The output of differential amplifier 62 is received on lead 63. The input to variable limiter 60 is received on lead 61 from servo 56. The output is coupled to MDA 48 on lead 50. Input lead 61 is connected to output lead 50 through an input resistor 68. Lead 63 is connected to the inverting input of an operational amplifier (op amp) 70 having a feedback resistor 72. The output is connected to the cathode of a diode 74, the anode of which is connected to lead 50. The output of op amp 70 is connected to the inverting input of a second op amp 76 through a resistor 78. Op amp 76 also has a feedback resistor 80 which is connected to the output of op amp 76 as well as to the anode of a diode 82. The cathode of diode 82 is connected to lead 50. Diodes 74, 82 serve as positive and negative clipping diodes which are biased by the op amps 70, 76, which function as variable bias voltage sources for the clipper circuits.

As described previously the input voltage level on lead 63 varies between a maximum and minimum range. In the preferred embodiment, the voltage level varies from zero volts to a maximum of 10 volts. When zero volts is input to op amp 70, the output on lead 50 may vary between plus and minus 0.7 volts, which is the diode voltage. With an input of 10 volts on lead 63, the output on lead 50 can then vary between plus and minus 10.7 volts. By varying the input signal on lead 63 the output siglal on 50, regardless of the signal input on input lead 61, is limited to the range controlled by limiter 60. Although limiting in one direction is all that is required for the operation of the preferred embodiment, it will be seen that limiter 60 may be used as a limiter in both positive and negative directions, for operation in other applications of motor 46, as has been described.

It will therefore be appreciated that the preferred embodiment of the present invention provides for in-cassette tape tensioning using servo systems on the cassette reels which are also used in other tape operations, thereby avoiding the necessity for providing a completely separate apparatus of the form described in FIG. 2. It will be appreciated that other forms of tape-tensioning apparatus may also be designed which are within the scope of the present invention. Thus, while the invention has been particularly shown and described with reference to the foregoing preferred embodiment, it will be understood by those skilled in the art that other changes in form and detail may be made therein without departing from the spirit and scope of the invention as defined in the claims.

What is claim is:

1. Apparatus for tensioning tape between two reels on which the tape is wound, comprising:
   first and second motor means for driving a first and a second one of the reels, respectively;
   means for increasing energization of said first motor means directly proportionally to a displacement of the first reel from a selected displacement operating state, to urge the first reel to said selected displacement operation state; and
   means responsive to the energization of said first motor means for energizing said second motor means for operating the second reel in a displacement operating state appropirate for maintaining tension on the tape extending between the two reels.

2. The apparatus of claim 1 wherein said means for energizing said second motor means varies the ener-giziation of said second motor means inversely with respect to the displacement of said first reel.

3. The apparatus of claim 1 wherein the selected displacement operating state of the first reel is a selected rotational position.

4. The apparatus of claim 3 wherein said means for energizing said first motor means further includes means for producing a signal indicative of the position of the first reel, and means responsive to the signal indicative of the first reel position for producing a control signal indicative of the difference between the first reel position and the selected position of the first reel.

5. Apparatus for tensioning tape between two reels on which the tape is wound, comprising:
   first motor means for driving a first one of the reels;
   second motor means for driving a second one of the reels;
   means for producing a first signal indicative of the rotational position of the first reel;
   means responsive to the first signal, and to a reference signal indicative of a selected position of the first reel, for producing a third signal for energizing said first motor means for urging the first reel toward the selected position when the reel is displaced from the selected position; and
   means responsive to the third signal and to a reference signal indicative of a selected level of energization of said second motor means when the first reel is in the selected position, for producing a fourth signal for energizing said second motor means with a level of energization which is less when the first reel is displaced from the selected position relative to when the first reel is in the selected position.

6. The apparatus of claim 5 wherein said means for producing a third signal increases the energization of said first motor means with displacement of the first reel from the selected position, said means for producing a fourth signal energizes said second motor means when the first reel is displaced from the selected position, for holding the second reel in a displaced position.

7. In a tape transport including a pair of motors for winding tape on a pair of reels placeable in engagement with the motors, apparatus comprising:
   means for controlling the energization of a first one of the motors to urge the associated reel toward a selected rotational position, and means for controlling the energization of the second motor for urging the associated reel toward a selected velocity;
   means responsive to the eenergization of the first motor, and to a reference signal indicative of a selected energization of the second motor when the tape between the two reels is slack, for producing a signal indicative of a reduced maximum energization of the second motor when energization of the first motor increases; and
   means responsive to the signal indicative of reduced energization of the second motor, and interposed the second motor and the means for controlling the second motor, for limiting the maximum energization of the second motor.

8. A tape transport for winding tape on a pair of reels and for tensioning tape extending between the reels, comprsing:
   first motor means for driving a first one of the reels;
   second motor means for driving a second one of the reels;
   third means for energizing said first motor means for urging the first reel toward a selected operating state, including increasing the energization of said first motor means when the first reel is displaced from the selected operating state;
   fourth means for energizing said second motor means for operating the second reel relative to the selected operating state of the first reel, for winding up any slack tape extending between the reels; and
   fifth means responsive to the energizaion of said first motor means for limiting the energization of said second motor means, for maintaining the tape extending between the reels in tension after any slack tape has been wound up.

9. The transport of claim 8 wherein said limiting means includes:
   sixth means, responsive to the energization of said first motor means and to a reference signal indicative of a selected level of energization of said second motor means when the first reel is in the selected operating state, for producing a signal indicative of a reduced maximum energization of said second motor means when energization of said first motor means is increased, and seventh means, responsive to the signal indicative of a reduced maximum energization and interposed said second motor means and said sixth means, for controlling the energization of said second motor means for limiting the maximum energization of said second motor means.

10. The transport of claim 8 wherein the selected operating state of the first reel is a selected rotational position.

* * * * *